US007719668B2

(12) United States Patent
Ilev

(10) Patent No.: US 7,719,668 B2
(45) Date of Patent: May 18, 2010

(54) CONFOCAL FIBER-OPTIC LASER DEVICE AND METHOD FOR INTRAOCULAR LENS POWER MEASUREMENTS

(75) Inventor: Ilko Ilev, Rockville, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 11/885,544

(22) PCT Filed: Mar. 3, 2006

(86) PCT No.: PCT/US2006/007474

§ 371 (c)(1),
(2), (4) Date: May 28, 2008

(87) PCT Pub. No.: WO2006/096469

PCT Pub. Date: Sep. 14, 2006

(65) Prior Publication Data
US 2008/0278712 A1  Nov. 13, 2008

Related U.S. Application Data

(60) Provisional application No. 60/668,239, filed on Mar. 3, 2005.

(51) Int. Cl.
*G01B 9/00* (2006.01)
(52) U.S. Cl. ........................................ 356/124; 356/125
(58) Field of Classification Search .................. 356/121, 356/127
See application file for complete search history.

(56) References Cited

U.S. PATENT DOCUMENTS 5,123,735 A * 6/1992 Hegarty ....................... 356/125
5,847,822 A   12/1998 Sugiura et al.

OTHER PUBLICATIONS

International Preliminary Report on Patentability for PCT/US2006/007474; mailed Sep. 20, 2007 (1 pg).
Written Opinion of the International Searching Authority for PCT/US2006/007474; mailed Aug. 14, 2006 (3 pgs).

(Continued)

*Primary Examiner*—Michael P Stafira
(74) *Attorney, Agent, or Firm*—Teddy C. Scott, Jr.; Polsinelli Shughart

(57) ABSTRACT

A lens power measuring system has a light source and a fiber-optic light delivery system optically coupled to the light source to receive illumination light from the light source. The fiber-optic light delivery system has a transmit/receive end. The lens power measurement system also has a microscope objective optically coupled to the fiber-optic light delivery system through the transmit/receive end of the fiber-optic light delivery system, a movable mirror arranged to intercept at least a portion of light after having passed through the microscope objective, and an optical detection system optically coupled to the fiber-optic light delivery system to receive light after having been reflected from said movable mirror. The optical detection system is constructed to be able to determine a substantially maximum signal of light reflected from the movable mirror in correspondence with a relative position of the movable mirror to a lens to be measured. Methods of measurement include methods using such a lens system.

16 Claims, 5 Drawing Sheets

OTHER PUBLICATIONS

David J. Apple and John Sims, MD; "Harold Ridley and the Invention of the Intraocular Lens"; Survey of Ophthalmology; vol. 40; No. 4; Jan.-Feb. 1996 (14 pgs).

National Eye Institute; US NIH; Research Today; "The Eye Diseases Prevalence Research Group"; Statistics and Data; Citations and Abstracts from Apr. 2004 Archives of Ophthalmology (2 pgs).

Warren J. Smith; "Modern Optical Engineering: The Design of Optical Systems"; Optical and electro-Optical Engineering Series; $2^{nd}$ Edition; McGraw-Hill, Inc. 1990 (14 pgs).

Yoshiaki Nakano and Kazumi Murata; "Talbot Interferometry for Measuring the Focal Length of a Lens"; Applied Optics, vol. 24, No. 19, Oct. 1, 1985 (5 pgs).

Der-Chin Su and Chon-Wen Chang; "A New Technique for Measuring the Effective Focal Length of a Thick Lens or a Compound Lens"; Optics Communications, vol. 78, No. 2, Aug. 15, 1990 (5 pgs).

Eliezer Keren, Kathi M. Kreske and Oded Kafri; "Universal Method for Determining the Focal Length of Optical Systems by Moire Deflectometry"; Applied Optics, Apr. 15, 1988; vol. 27, No. 8 (3 pgs).

D. Tognetto; G. Sanguinetti, P. Sirotti, P. Cecchini, L. Marcucci, E. Ballone and G. Ravalico; "Analysis of the Optical Quality of Intraocular Lenses"; Investigative Ophthalmology & Visual Science; Aug. 2004, vol. 45, No. 8 (9 pgs).

N.E. S. Norrby, L.W. Grossman, E.P. Geraghty, C.F. Kreiner, M. Mihori, A.S. Patel, V. Portney and D.M. Silberman; "Accuracy in Determining Intraocular Lens Dioptric Power Assessed by Interlaboratory Tests"; Cataract Refract Surg—vol. 22, Sep. 1996 (11 pgs).

I.K. Ilev; "Simple Fiber-Optic Autocollimation Method for Determining the Focal Lengths of Optical Elements"; Institute of Applied Physics, Technical University of Sofia, Mar. 15, 1995, vol. 20, No. 6, Optics Letters (3 pgs).

I. Ilev, D. Uttamchandani and B. Culshaw; "Fiber-optic Backreflectance Method for Determining the Effective Focal Lengths of Optical Elements"; Applied Optics, vol. 35, No. 4, Feb. 1, 1996 (3 pgs).

I.K. Ilev; H. Kumagai, K. Toyoda, D. Uttamchandani and B. Culshaw; "Alternative Fiber-Optic Backreflectance Sensor for Measurement of the Effective Focal Lengths of Optical Elements and Distances"; Optical Review, vol. 4, No. 1A (1997) (3 pgs).

B.A. Flusberg, E.D. Cocker, W. Piyawattanametha, J.C. Jung; E. Cheung and M.J. Schnitzer; "Fiber-optic Fluorescence Imaging"; Nature Methods, vol. 2, No. 12, Dec. 2005 (10 pgs).

* cited by examiner

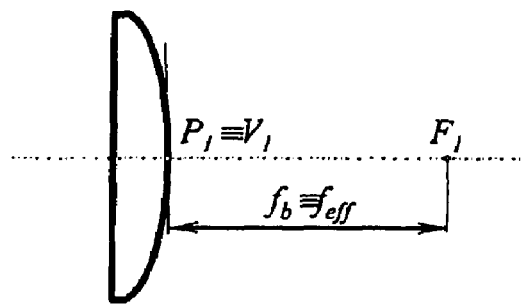
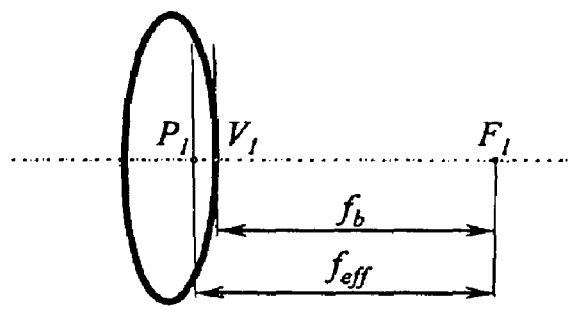
FIG. 2
FIG. 3

IOL POSITIVE DIOPTIC POWER MEASUREMNT

| Test Lens S/N (Sub-Number) Official Sample Number | Lens Power (labeled) [D] | IOL in Fresh Salt Solution (35 degree C, 1/19/2005) | | | | | IOL in Fresh Salt Solution (35 degree C, repeated 2/1/2005) | | | |
|---|---|---|---|---|---|---|---|---|---|---|
| | | | Lens Power (measured) [D] | Average Lens Power [D] | Repeatability Standard Deviation [D] (Relative Error) | Corrected Lens Power [D] | | Lens Power (measured) [D] | Average Lens Power [D] | Repeatability Standard Deviation [D] (Relative Error) | Corrected Lens Power [D] |
| 1 | +25.50 | 1 | +25.420 | +25.412 | 0.012 (0.04796) | +24.523 | 1 | +25.491 | +25.497 | 0.006 (0.023%) | +24.605 |
| | | 2 | +25.419 | | | | 2 | +25.502 | | | |
| | | 3 | +25.398 | | | | 3 | +25.499 | | | |
| 2 | +25.50 | 1 | +25.502 | +25.493 | 0.013 (0.050%) | +24.601 | 1 | +25.467 | +25.491 | 0.022 (0.086%) | +24.599 |
| | | 2 | +25.484 | | | | 2 | +25.498 | | | |
| | | 3 | +25.492 | | | | 3 | +25.509 | | | |
| 3 | +25.50 | 1 | +26.307 | +26.309 | 0.004 (0.015%) | +25.388 | | | | | |
| | | 2 | +26.314 | | | | | | | | |
| | | 3 | +26.307 | | | | | | | | |

FIG. 5

IOL NEGATIVE DIOPTIC POWER MEASUREMNT

| Test Lens | Lens Power Labeled [D] | Lens Power Measured [D] PROVIDER | Lens Power Measured [D] | Average Lens Power [D] | Repeatability Standard Deviation [D] (Relative Error) |
|---|---|---|---|---|---|
| 1 | -14.5 | -14.47 | -14.701<br>-14.719<br>-14.716 | -14.712 | 0.0096 (0.06%) |
| 2 | -14.5 | -14.55 | -14.682<br>-14.668<br>-14.656 | -14.669 | 0.013 (0.08%) |
| 3 | -12.0 | -11.96 | -11.946<br>-11.938<br>-11.946 | -11.943 | 0.005 (0.04%) |
| 4 | -12.0 | -12.04 | -12.034<br>-12.039<br>-12.04 | -12.038 | 0.003 (0.02%) |
| 5 | -8.0 | -7.82 | -7.737<br>-7.756<br>-7.751 | -7.746 | 0.013 (0.16%) |
| 6 | -8.0 | -7.84 | -7.762<br>-7.756<br>-7.751 | -7.756 | 0.005 (0.06%) |

CONFOCAL FIBER-OPTIC LASER DEVICE AND METHOD FOR INTRAOCULAR LENS POWER MEASUREMENTS

CROSS-REFERENCE TO RELATED APPLICATION

This application claims priority to International Application No. PCT/US2006/007474 filed Mar. 3, 2006 and U.S. Application No. 60/668,239 filed Mar. 3, 2005, the entire content of which is hereby incorporated by reference.

BACKGROUND

1. Field of Invention The present invention relates to devices for measuring optical powers of lenses and methods of measuring optical powers of lenses.

2. Discussion of Related Art

All references cited anywhere in this specification, including this background section, are hereby incorporated by reference herein.

Since the invention and first implantation of an intraocular lens (IOL) back in 1949 (Apple, D. & Sims, J. *Surv. Opthalmol.* 40, 279-292 (1996)), the development and use of IOL's has revolutionized refractive cataract surgery. An estimated 20.5 million Americans over age 40 have cataracts in at least one eye and more than 1.5 million cataract surgeries are performed per year. (See, National Eye Institute, *Archive of Opthalmology*, accessed Jun. 22, 2005, http://www.nei.nih.gov/eyedata/pbd6.asp.) The focal length (or dioptric power) is a fundamental parameter whose precise measurement is of critical importance for characterizing and evaluating the effectiveness and safety of a single focusing optical element or systems such as various positive and negative IOL's, contact lenses, eyeglasses, conventional lenses, objectives, and mirrors. Because of the complexity in accurately locating the principal focal planes that usually lie within the focusing element, various indirect methods for focal length measurement are conventionally used such as image magnification, autocollimation, nodal slide, Bessel's method, moiré deflectometry, and Talbot interferometry. (See, W. Smith, *Modern Optical Engineering* (McGraw-Hill, New York, 1990); Nakano, Y. & Murata, K. *Applied Optics* 24, 3162-3166 (1985); Su, D. & Chang, C. *Optics Communications* 78, 118-122 (1990); Keren, E. et al. *Applied Optics* 27, 1383-1365 (1988); Tognetto, D. et al, *Investigative Opthalmology and Visual Science* 45, 2682-2688 (2004); and Norrby, N. et al. *Journal of Cataract and Refractive Surgery* 22, 983-987 (1996).) The effectiveness of most of these methods is often limited in regards to high accuracy, dynamic range over which measurements can be performed (for both positive and negative dioptric powers), spatial sample alignment and subjectively image observation. Recently (Ilev, I. *Optics Letters* 20, 527-529 (1995); Ilev, I. et al. *Applied Optics* 35, 716-718 (1996); and Ilev, I. et al. *Optical Review* 4, 58-60 (1997)), we have demonstrated a fiber-optic based back-reflectance technique for testing focusing optical elements with relatively large numerical apertures and short positive focal lengths. This approach is compatible with high-resolution confocal laser microscopy and the combined fiber-optic confocal imaging systems offer advantages in terms of high spatial resolution, flexibility, miniaturization and scanning potential. (See, B. Flusberg et al. *Nature Methods* 2, 941-950 (2005).) For at least these and other reasons there is a need for improved devices and methods of measuring optical powers of lenses.

SUMMARY

A lens power measuring system has a light source and a fiber-optic light delivery system optically coupled to the light source to receive illumination light from the light source. The fiber-optic light delivery system has a transmit/receive end. The lens power measurement system also has a microscope objective optically coupled to the fiber-optic light delivery system through the transmit/receive end of the fiber-optic light delivery system, a movable mirror arranged to intercept at least a portion of light after having passed through the microscope objective, and an optical detection system optically coupled to the fiber-optic light delivery system to receive light after having been reflected from said movable mirror. The optical detection system is constructed to be able to determine a substantially maximum signal of light reflected from the movable mirror in correspondence with a relative position of the movable mirror to a lens to be measured.

A method of measuring an optical power of a lens includes generating illumination light, coupling the illumination light into a fiber-optic light delivery system, transmitting illumination light from a transmit/receive end of the fiber-optic light delivery system, collimating light transmitted from the transmit/receive end of the fiber-optic light delivery system, disposing a lens to be measured in a path of illumination light that has been collimated, reflecting illumination light that passed through the lens-to-be-measured from a reflecting surface back through the lens-to-be-measured to be coupled into the transmit/receive end of the fiber-optic delivery system, detecting at least some of the light coupled into the transmit/receive end of the fiber-optic delivery system as the reflecting surface is varied in axial position relative to the lens to be measured, determining a position of the reflecting surface relative to the lens to be measured based upon a substantially maximum of a detected light signal, and determining an optical power of the lens to be measured based on the determined relative position of the reflecting surface.

BRIEF DESCRIPTION OF THE DRAWINGS

The invention is described herein, by way of example only, with reference to the accompanying figures, in which like components are designated by like reference numerals in which:

FIG. 2 an illustration of a plano-convex lens to illustrate a determination of a lens power according to an embodiment of the current invention;

FIG. 3 an illustration of a bi-convex lens to illustrate a determination of a lens power according to an embodiment of the current invention;

FIG. 5 is a table displaying measured data for positive lenses according to an embodiment of the current invention; and FIG. 6 is a table displaying measured data for positive lenses according to an embodiment of the current invention.

DETAILED DESCRIPTION

Figure 1:
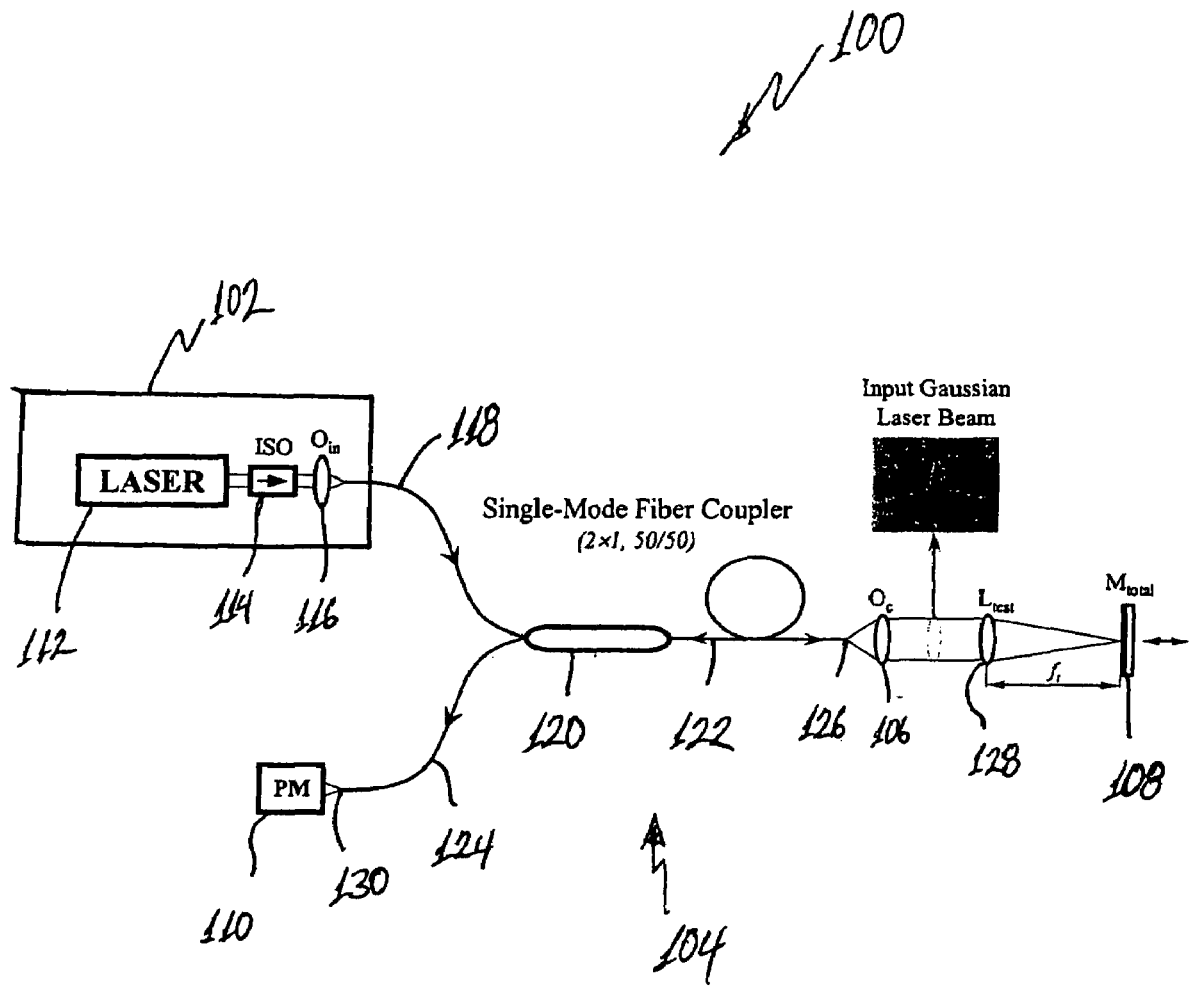
FIG. 1 is a schematic illustration of an embodiment of a lens power measuring system according to an embodiment of the current invention.

FIG. 1 illustrates a lens power measurement system 100 according to an embodiment of this invention. The lens power measurement system 100 has a light source 102, a fiber-optic light delivery system 104, a microscope objective 106, a movable mirror 108, and an optical detection system 110. The lens power measurement system 100 has a lens support structure suitable to hold a lens to be measured between the microscope objective 106 and the movable mirror 108.

The light source 102 includes a laser 112, an optical isolator 114 and a lens unit 116. The laser is an intensity stabilized laser. Lasers having outputs in the ultraviolet, visible and infrared spectral ranges are suitable for the laser 112. Good results have been obtained using continuous wave (cw), low-output power lasers for laser 112. For example, cw lasers having 10-30 mW output power, intensity stabilized with output power fluctuations less than about 0.5% can be used. Optical isolators having less than about 20 dB isolation and greater than about 95% transmission efficiency are suitable for the optical isolator 114. The lens unit 116 couples at least a portion of laser light from the laser 112 into the optical delivery system 104. The lens unit 116 can be a single converging lens, a single focusing objective, a plurality of lenses, compound lenses, any combination thereof, or any suitable means to couple light from the laser 112 into the optical delivery system 104.

The optical delivery system 104 includes a first single-mode optical fiber 118, a single-mode fiber coupler 120, a second single-mode optical fiber 122 and a third single-mode optical fiber 124. A 2×1, 50/50 single-mode fiber coupler having not more than about 3 dB insertion loss is suitable for the single-mode fiber coupler 120. The first single-mode optical fiber 118 is constructed and arranged to receive light from laser 112 coupled into an input end through coupling lens 116. The first single-mode optical fiber has an output end optically coupled to a first port of the single-mode fiber coupler 120. The second single-mode optical fiber 122 is optically coupled to a second port of the single-mode fiber coupler 120. The third single-mode optical fiber 124 has an input end coupled to a third port of the single-mode fiber coupler 120. Light from the laser 112, after being coupled into the first single-mode optical fiber 118, passes through the single-mode fiber coupler 120 into the second single-mode optical fiber 122 to be emitted from a transmit/receive end 126 of the second single-mode optical fiber 122. The first, second and third single-mode optical fibers 118, 122 and 124, respectively, support a single mode of transmission at the transmission wavelength of the laser 112. Furthermore, the first, second and third single-mode optical fibers 118, 122 and 124, respectively, produce an output beam having a Gaussian intensity distribution in which the center of the beam is brightest and the intensity drops off exponentially towards the edges of the beam. Single mode fibers having core diameters of about 3 to 5 micrometers have been found to be suitable.

The microscope objective 106 is an infinity-corrected microscope objective which receives light emitted from the transmit/receive end 126 of the second single-mode optical fiber 122 and forms a substantially collimated beam of laser light. Various magnifications for the microscope objective can be used. For examples, microscope objectives having magnifications within the range of 4× to 100× are suitable for some applications of embodiments of this invention. The laser light that emerges from the microscope objective 106 has a substantially Gaussian cross-sectional intensity distribution, as is represented schematically in FIG. 1. A positive lens 128 to be measured is disposed in a collimated beam emerging from the microscope objective 106. The positive lens 128 to be measured may be held fixed by a lens holder.

The movable mirror 108 may be connected to a multi-axis translation stage. Various angular and linear multi-axis translation stages, including digital micrometers, having not more than about 1 micrometer resolution are suitable. The movable mirror 108 may be a substantially totally reflecting mirror. For example, dielectric or metal-coated mirrors having greater than about 90% reflectance at the laser wavelength and about zero degrees angle of incidence are suitable.

The optical detection system 110 may include an optical digital power meter. Optical digital power meters having 1 nW-50 mW power range, less than 2% accuracy, a 300-1800 nm spectral range, an averaging potential and a computer interface have been found to be suitable.

In operation, laser light from laser 112 passes through the optical isolator 114 and is coupled into the first single-mode optical fiber 118 through lens unit 116. Light from the laser travels through the first single-mode optical fiber 118, and through the single-mode fiber coupler 120 into the second single-mode optical fiber 122 to be emitted from the transmit/receive end 126 of the second single-mode optical fiber 122. This is the transmit process. Light then emerges from the transmit/receive end 126 of the second single-mode optical fiber 122 and enters the microscope objective 106 to emerge as a substantially collimated beam of light. The positive lens 128 to be measured converges the substantially collimated beam of light from the microscope objective 106 substantially to a point corresponding to its focal length, thus providing its power.

The movable mirror 108 reflects light from the positive lens 128 back through the positive lens 128 again and through the microscope objective 106 to be coupled into the transmit/receive end 126 of the second single-mode optical fiber 122. This is the receive process. The light received then passes through the 2×1 single-mode fiber coupler 120 and enters the third single-mode optical fiber 124. Light then exits from the measurement end 130 of the third single-mode optical fiber 124 to be detected by the optical detection system 110. The mirror 108 is moved at least backward and/or forward until a maximum intensity of light is detected at the light detection system 110 providing the measured focal distance from the positive lens 128 to the reflecting surface of the movable mirror 108.

Because of the high sensitivity to spatial displacements of the focused back-reflectance laser beam, this fiber-optic confocal arrangement can provide precise location of the focal point when the substantially total reflectance mirror is moved axially and thus, a high accuracy in measuring the focal length of the lens to be measured can be achieved. The output small-core-diameter single-mode fiber tip serves as substantially a point confocal light source that ensures a Gaussian beam distribution. The Gaussian mode distribution can also provide a precisely collimated input beam directed onto the test focusing lens. The conventional pinhole-based confocal systems have disadvantages related to significant signal attenuation, diffraction/aberration effects, misalignment problems and inflexibility. The fiber coupler (transmit/receive end 126) can provide delivery and intensity sensing of the spatially separated backreflected optical signals. The lens power measurement system 100 can have an accuracy exceeding 1 μm in spatially locating the focal point of the lens to be measured 128 and therefore, in measuring the focal length (providing the optical power). This embodiment of the invention is not limited in regard to numerical aperture and powers of the lens to be measured. To get high accuracy and repeatability, some specific preliminary alignments can be made, such as: laser-to-fiber coupling alignment providing maximum coupling efficiency; precise alignment of the system "fiber-tip/collimating-objective" which produces a parallel collimated Gaussian laser beam; and test lens and back reflectance mirror alignment at normal incidence towards the collimated laser beam.

For positive lens power measurements, the first step is to locate the focal point $F_1$ (see FIG. 2) of the positive power lens. The next step, using precise translational micrometric stages, is to measure the distance between the focal point $F_1$ and the lens's back vertex $V_1$. This distance is equal to the lens's back focal length $f_b$ that is a fundamental parameter of practical importance. Then, using the directly measured $f_b$, we can determine the effective focal length $f_{eff}$ the lens being measured. In a case of either thin or plano-convex lenses, the $f_{eff}$ is equal to the $f_b$ (see FIG. 2). To determine the $f_{eff}$ for lenses with different shapes (for instant, a bi-convex lens shown as shown in FIG. 3), we can use the following dependence between $f_{eff}$ and $f_b$:

$$f_{eff} = f_b / [1 - t(n_2 - n_1)/n_2 r_1] \quad (1)$$

where, t is the lens thickness, $r_1$ is the front surface radius of curvature, $n_1$ and $n_2$ are the refractive indexes of the lens and the surrounding medium (in air $n_1=1$), respectively. In a case of thin ($t \approx 0$) or plano-convex ($r_1 \approx \infty$) lenses, Eq 1 reduces to the simple dependence $f_{eff} = f_b$.

Figure 4:
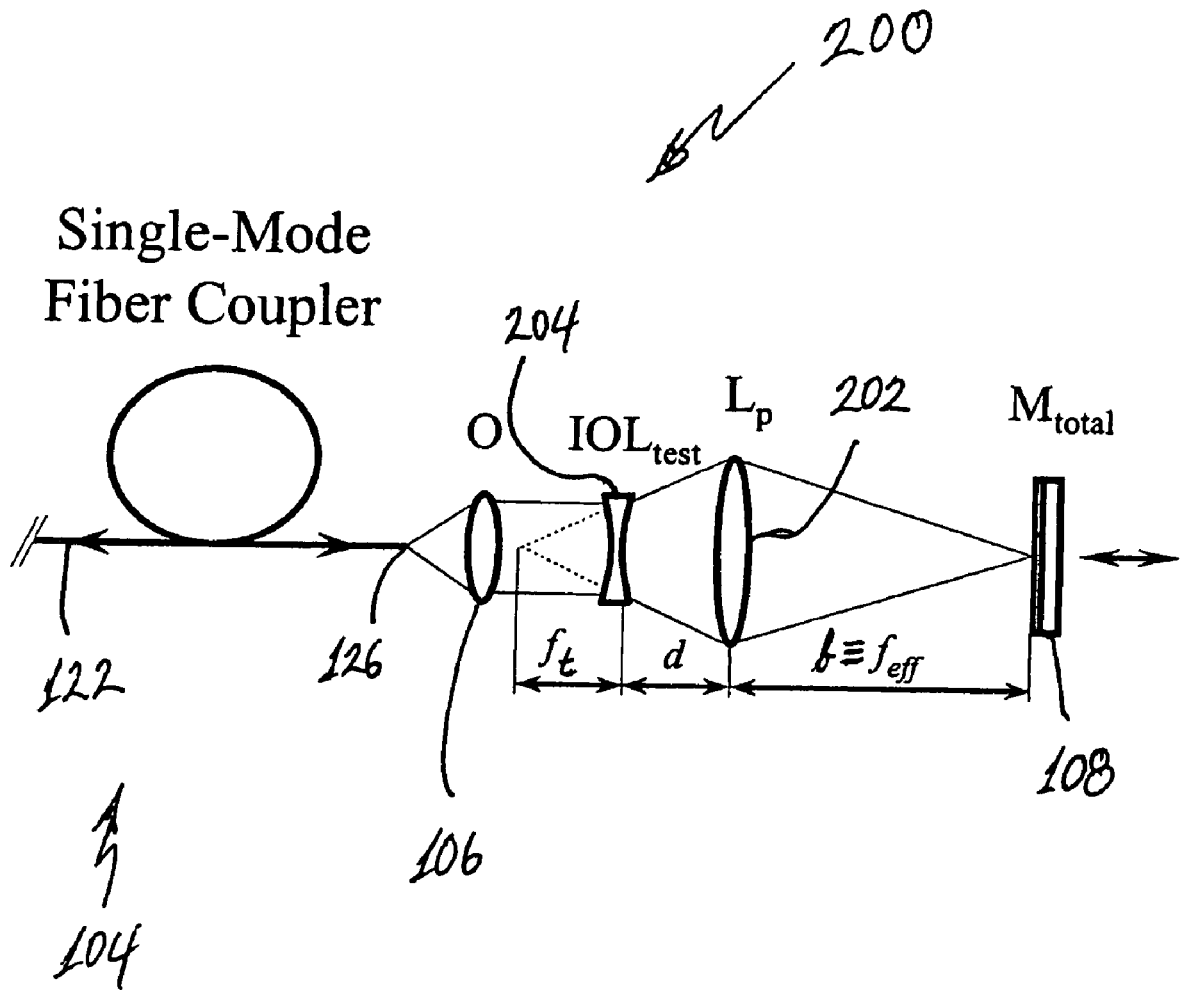
FIG. 4 is a schematic illustration of an embodiment of a negative lens power measuring system according to another embodiment of the current invention.

FIG. 4 illustrates a second embodiment according to the current invention. FIG. 4 is an embodiment which is suitable for measuring the power of negative lenses. Although not shown in entirety in FIG. 4, it may also include the light source 102, the fiber-optic light delivery system 104 and the optical detection system 110. The embodiment illustrated in FIG. 4 may be similar to or essentially the same as the embodiment of FIG. 1 except with a positive lens 202 arranged between the microscope objective 106 and the movable mirror 108. The negative lens 204 to be tested is arranged between the microscope objective 106 and the positive lens 202. Positive lens 202 has an accurately known positive optical power. Consequently, the collimated light emerging from the microscope objective 106 that is diverged by the negative lens 204 is again converged by positive lens 202. The operation of the lens power measurement system 200 is similar to that of a lens power measurement system 100. However, in this case, the distance between the mirror 108, the positive lens 202 and test lens 204, as well as the known power of the positive lens 202, permits one to determine the measured value of negative power for the test lens 204.

For negative power measurements, such as negative lens 204, the method of determining the power is as follows. The positive lens 202, $L_p$, can be a plano-convex lens, for example, with known focal length $f_p$. Then, using the classical lens equation 1/f=1/a+1/b for the negative-lens/positive-lens combination, we can get the following formula for determining the focal length $f_t$ of the test negative lens $L_{test}$:

$$f_t = f_p b / (b - f_p) - d \quad (2)$$

where, d and b are the distances between the two lenses, and the image to the positive lens, respectively. Thus, the procedure for negative power lens measurements is reduced to spatial location of the focal point $F_p$ and direct measurement of the distances d and b.

This example shows measurements for various IOL samples with both positive (from +5 to +30 diopters) and negative (from −5 to −20 diopters) dioptric powers. Because the current device has no limitation concerning the wavelength range of the laser source used for practical purposes, we have used laser sources with various wavelengths in the green/red visible spectral range including a He—Ne laser with a wavelength of 543.5 nm which is within the required spectral interval of 546±10 nm according to the ISO standard.

(Note that the optical fiber coupler that should be a single-mode one within the laser wavelength range.) We have measured the IOL powers under two environmental conditions: 1) in air with dry IOL samples, and 2) in an in situ simulation using glass or quartz cuvettes with IOL samples in balanced salt solutions of various concentrations. In order to test the IOL power measurement repeatability, each positive and negative power IOL has been tested at least three times at identical environmental conditions. For the positive IOL dioptric power measurements, we have obtained high repeatability with an estimated standard deviation in the range of 0.004-0.06 D and a relative error in the range of 0.015-0.3%. For the negative IOL dioptric power measurements, the test repeatability estimated by the standard deviation and relative error was in the interval of 0.003-0.013 D and 0.02-0.16%, respectively.

The accuracy of IOL power measurement depends on the following basic factors. First, the accuracy of focal point location depends upon the mirror displacement accuracy and the laser power/detection system signal fluctuations. Using an intensity stabilized laser (<0.1% power stability), a sensitive photodetecting system and a 1 μm linear mirror displacement, the signal levels registered at the maximum of the confocal response curve is higher than the signal fluctuations, which do not exceed 1%. Thus, an accuracy of 1 μm (or possibly <1 μm at lower signal fluctuations) in focal point location and therefore, of focal length measurement is achieved. Second, the use of a single-mode fiber coupler ensures a Gaussian mode distribution utilized for precise collimating and focusing of the input and back-reflectance beams. However, this distribution also requires a correction $[\pi^2 \omega_0^4 / \lambda^2 (a-f)]$ ($\omega_0$ is the characteristic Gaussian mode beam radius) to the distance a in the lens equation. In our case this addition is negligible due to the small value of the single-mode core radius. Third, the influence of the aberration effects on the measurement accuracy is negligible because a monochromatic laser emission is used, the mirror displacement is along the axis with additional angular adjustment and the laser beam distribution is Gaussian with strongly decreasing intensity in the laser spot periphery.

The FIG. 5 shows results of measurements for positive lenses and FIG. 6 shows results for measurements of negative lenses.

The embodiments illustrated and discussed in this specification are intended only to teach those skilled in the art the best way known to the inventors at the time of filing to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

I claim:
1. A method of measuring an optical power of an intraocular lens, comprising:
generating illumination light;
coupling said illumination light into a fiber-optic light delivery system;
transmitting illumination light from a transmit/receive end of said fiber-optic light delivery system;
collimating light transmitted from said transmit/receive end of said fiber-optic light delivery system;

disposing an intraocular lens to be measured in a path of illumination light that has been collimated;

reflecting illumination light that passed through said intraocular lens-to-be-measured from a reflecting surface back through said intraocular lens-to-be-measured to be coupled into said transmit/receive end of said fiber-optic delivery system;

detecting at least some of said light coupled into said transmit/receive end of said fiber-optic delivery system as said reflecting surface is varied in position relative to said intraocular lens to be measured;

determining a position of said reflecting surface relative to said intraocular lens to be measured based upon a substantially maximum of a detected light signal; and determining an optical power of said intraocular lens to be measured based on said determined said relative position of said reflecting surface.

2. A method of measuring an optical power of an intraocular lens according to claim 1, wherein said intraocular lens to be measured has a positive optical power.

3. A method of measuring an optical power of an intraocular lens according to claim 1, further comprising converging light as it passes from said intraocular lens to be measured to said reflecting surface by a lens having a predetermined, positive optical focusing power.

4. A method of measuring an optical power of an intraocular lens according to claim 3, wherein said intraocular lens to be measured has a negative optical power.

5. A method of measuring an optical power of an intraocular lens according to claim 1, wherein said illumination light is generated by a continuous wave, intensity stabilized laser to provide laser illumination light at a laser wavelength.

6. A method of measuring an optical power of an intraocular lens according to claim 5, wherein said fiber-optic light delivery system comprises a plurality of single mode optical fibers that support a single transmission mode at said laser wavelength.

7. An intraocular lens power measuring system, comprising:

a light source;

a fiber-optic light delivery system optically coupled to said light source to receive illumination light from said light source, said fiber-optic light delivery system having a transmit/receive end;

a microscope objective optically coupled to said fiber-optic light delivery system through said transmit/receive end of said fiber-optic light delivery system;

a movable mirror arranged to intercept at least a portion of light after having passed through said microscope objective; and an optical detection system optically coupled to said fiber-optic light delivery system to receive light after having been reflected from said movable mirror, wherein said optical detection system is constructed to be able to determine a substantially maximum signal of light reflected from said movable mirror in correspondence with a relative position of said movable mirror to an intraocular lens to be measured.

8. An intraocular lens power measuring system according to claim 7, wherein said light source comprises a continuous wave, intensity-stabilized laser to provide illumination light at a laser wavelength.

9. An intraocular lens power measuring system according to claim 8, wherein said light source comprises an optical isolator and a lens unit, said lens unit being constructed and arranged to couple illumination light into said fiber-optic light delivery system.

10. An intraocular lens power measuring system according to claim 9, wherein said fiber-optic light delivery system comprises a plurality of single-mode optical fibers that support a single transmission mode at said laser wavelength.

11. An intraocular lens power measuring system according to claim 10, wherein said fiber-optic light delivery system comprises a 2×1 single-mode fiber coupler.

12. An intraocular lens power measuring system according to claim 11, wherein illumination light after passing through said microscope objective from said transmit/receive end of said fiber-optic light delivery system has a substantially Gaussian intensity distribution in its cross section.

13. An intraocular lens power measuring system according to claim 7, further comprising a lens having a predetermined positive optical power disposed in an optical path between said microscope objective and said movable mirror with a space reserved therebetween suitable to dispose a negative intraocular lens to be measured.

14. An intraocular lens power measuring system according to claim 7, wherein said microscope objective is an infinity-correcting microscope objective.

15. A method of measuring an optical power of an intraocular lens according to claim 1, wherein a focal length of said intraocular lens is measured to an accuracy of at least 1 μm.

16. An intraocular lens power measuring system according to claim 7, wherein intraocular lens power measuring system is constructed to measure a focal length of said intraocular lens is measured to an accuracy of at least 1 μm.

* * * * *